United States Patent
Sakaguchi et al.

(10) Patent No.: US 10,732,628 B2
(45) Date of Patent: Aug. 4, 2020

(54) SENSOR MANAGEMENT DEVICE AND SENSOR MANAGEMENT METHOD

(71) Applicant: Kubota Corporation, Osaka-shi (JP)

(72) Inventors: Kazuo Sakaguchi, Amagasaki (JP);
Izuru Shimamoto, Amagasaki (JP);
Kenji Tamatani, Amagasaki (JP);
Megumi Suzukawa, Amagasaki (JP);
Atsushi Shinkai, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 86 days.

(21) Appl. No.: 15/628,655

(22) Filed: Jun. 21, 2017

(65) Prior Publication Data
US 2018/0210444 A1    Jul. 26, 2018

(30) Foreign Application Priority Data

Jan. 20, 2017    (JP) .................................. 2017-008353

(51) Int. Cl.
*G05D 1/00* (2006.01)
*G05D 1/02* (2020.01)
(Continued)

(52) U.S. Cl.
CPC ............ *G05D 1/0061* (2013.01); *G01S 7/497* (2013.01); *G01S 7/52004* (2013.01); *G01S 15/86* (2020.01); *G01S 15/931* (2013.01); *G01S 17/86* (2020.01); *G01S 17/931* (2020.01); *G05B 19/042* (2013.01); *G05D 1/005* (2013.01); *G05D 1/024* (2013.01); *G05D 1/0246* (2013.01); *G05D 1/0255* (2013.01); *G01S 2007/4975* (2013.01); *G05B 2219/2663* (2013.01); *G05B 2219/45017* (2013.01); *G05D 2201/02* (2013.01); *G05D 2201/0201* (2013.01)

(58) Field of Classification Search
CPC combination set(s) only.
See application file for complete search history.

(56) References Cited

U.S. PATENT DOCUMENTS

| 5,229,975 A | * | 7/1993 | Truesdell | .................. G01S 7/64 367/107 |
| 2004/0155759 A1 | * | 8/2004 | Gunderson | ........... G01S 13/931 340/435 |

(Continued)

FOREIGN PATENT DOCUMENTS

| JP | 2015-222503 | 12/2015 |
| WO | WO 01/61377 A2 | 8/2001 |
| WO | WO 01/61377 A3 | 8/2001 |

OTHER PUBLICATIONS

Extended European Search Report for corresponding EP Application No. 17174763.7-1802, dated Nov. 13, 2017.

*Primary Examiner* — Rami Khatib
(74) *Attorney, Agent, or Firm* — Mori & Ward, LLP

(57) ABSTRACT

A sensor management device includes first circuitry and second circuitry. The first circuitry is configured to output an instruction to position a target obstacle on a detectable region of at least one obstacle sensor provided on a work vehicle to detect an obstacle. The second circuitry is configured to determine, based on an output of the at least one obstacle sensor with respect to the target obstacle, whether the at least one obstacle sensor works normally.

10 Claims, 6 Drawing Sheets

(51) Int. Cl.
  *G01S 15/931* (2020.01)
  *G01S 7/52* (2006.01)
  *G01S 7/497* (2006.01)
  *G05B 19/042* (2006.01)
  *G01S 15/86* (2020.01)
  *G01S 17/86* (2020.01)
  *G01S 17/931* (2020.01)

(56) References Cited

U.S. PATENT DOCUMENTS

2015/0326829 A1* 11/2015 Kurihara ............... H04N 7/181
                                                            348/148
2019/0106086 A1*  4/2019 Giraud .................. B60S 1/0848

* cited by examiner

SENSOR MANAGEMENT DEVICE AND SENSOR MANAGEMENT METHOD

CROSS-REFERENCE TO RELATED APPLICATIONS

The present application claims priority under 35 U. S. C. § 119 to Japanese Patent Application No. 2017-008353, filed Jan. 20, 2017. The contents of this application are incorporated herein by reference in their entirety.

BACKGROUND OF THE INVENTION

Field of the Invention

The present invention relates to a sensor management device and a sensor management method.

Discussion of the Background

A work vehicle capable of automatic travel includes an obstacle sensor. The obstacle sensor detects, in a contactless manner, an obstacle that may collide with the work vehicle that is traveling. When an obstacle is detected, the work vehicle negotiates the obstacle or stops urgently so as to avoid the collision with the obstacle. It is therefore necessary to prohibit the work vehicle from traveling automatically if the obstacle sensor does not operate normally.

Japanese Patent Application Laid-open No. 2015-222503 discloses a work vehicle that includes obstacle detecting means, such as obstacle sensors and cameras, for detecting an obstacle around the work vehicle. When an obstacle is detected, an alarm is given to make a driver decelerate or stop the work vehicle. Moreover, when the driver presses a key switch to start an engine or when the driver presses a check switch disposed on a remote controller or disposed near a driver's seat, the work vehicle automatically performs an abnormal condition check on each obstacle sensor before starting to travel automatically. The abnormal condition check involves a determination as to whether an obstacle sensor outputs predetermined voltage (i.e., a determination as to whether an obstacle sensor outputs abnormal voltage), a determination as to whether an obstacle sensor is short-circuited, and a determination as to whether an obstacle sensor is disconnected. If an obstacle sensor is in any abnormal condition, the name of the abnormal obstacle sensor and the details of the abnormal condition are displayed on a display, and the automatic travel is not permitted.

SUMMARY OF THE INVENTION

According to one aspect of the present invention, a sensor management device includes first circuitry and second circuitry. The first circuitry is configured to output an instruction to position a target obstacle on a detectable region of at least one obstacle sensor provided on a work vehicle to detect an obstacle. The second circuitry is configured to determine, based on an output of the at least one obstacle sensor with respect to the target obstacle, whether the at least one obstacle sensor works normally.

According to another aspect of the present invention, a sensor management method includes outputting an instruction to position a target obstacle in a detectable region of at least one obstacle sensor provided on a work vehicle to detect an obstacle. Whether the at least one obstacle sensor works normally is determined based on an output of the at least one obstacle sensor with respect to the target obstacle.

According to further aspect of the present invention, a sensor management device includes instruction outputting means and determination means. The instruction outputting means are for outputting an instruction to position a target obstacle in a detectable region of at least one obstacle sensor provided on a work vehicle to detect an obstacle. The determination means are for determining, based on an output of the at least one obstacle sensor with respect to the target obstacle, whether the at least one obstacle sensor works normally.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
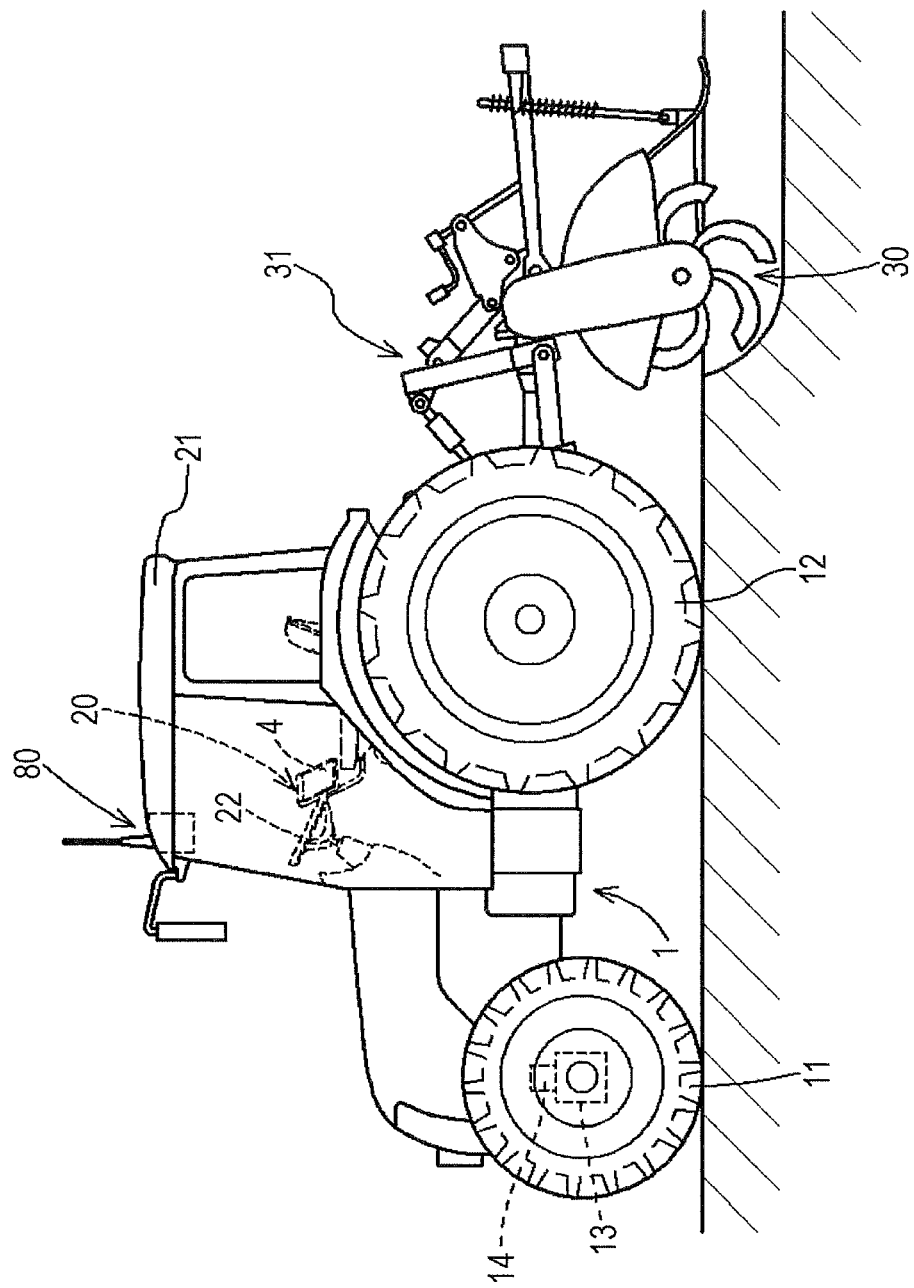
FIG. 1 is a side view of a tractor being an example of a work vehicle that can automatically travel along a travel route.

The embodiments will now be described with reference to the accompanying drawings, wherein like reference numerals designate corresponding or identical elements throughout the various drawings.

With reference to the drawings, next, a description will be given of a work vehicle capable of automatic travel according an embodiment of to the present invention. In this embodiment, the work vehicle is a tractor that conducts work and travel on a field (a work area) partitioned with ridges. The term "work and travel" used herein may involve a state in which the work vehicle works a field while traveling the field, a state in which the work vehicle simply travels a field, a state in which the work vehicle simply works a field, and a state in which the work vehicle halts the work and travel.

As illustrated in FIG. 1, in the tractor, a cockpit section 20 is disposed at a center of a vehicle body 1 supported by front wheels 11 and rear wheels 12. A work device 30 being a rotary cultivating device is mounted to the back side of the vehicle body 1 with a lifting mechanism 31 of a hydraulic type. The front wheels 11 serve as driving wheels, and a traveling direction of the tractor is changed by changing a steering angle of the front wheels 11. The steering angle of the front wheels 11 is changed by actuating a steering mechanism 13. The steering mechanism 13 includes a steering motor 14 for automatic steering. In manual travel, the front wheels 11 can be steered by operating a steering wheel 22 disposed on the cockpit section 20. The cockpit section 20 is equipped with a general-purpose terminal 4 having a function of giving information to a driver and a function of receiving information from the driver. A cabin 21 of the tractor is provided with a satellite positioning module 80 configured as a global navigation satellite system (GNSS) module. A satellite antenna that constitutes a part of the satellite positioning module 80 to receive a GNSS signal (including a global positioning system (GPS) signal) is mounted on a ceiling region of the cabin 21. For complementation of satellite navigation, the satellite positioning module 80 may be combined with an inertial navigation module including a gyro/acceleration sensor and a magnetic azimuth sensor. The inertial navigation module may be installed at a place different from a place where the satellite positioning module 80 is installed.

Figure 2:
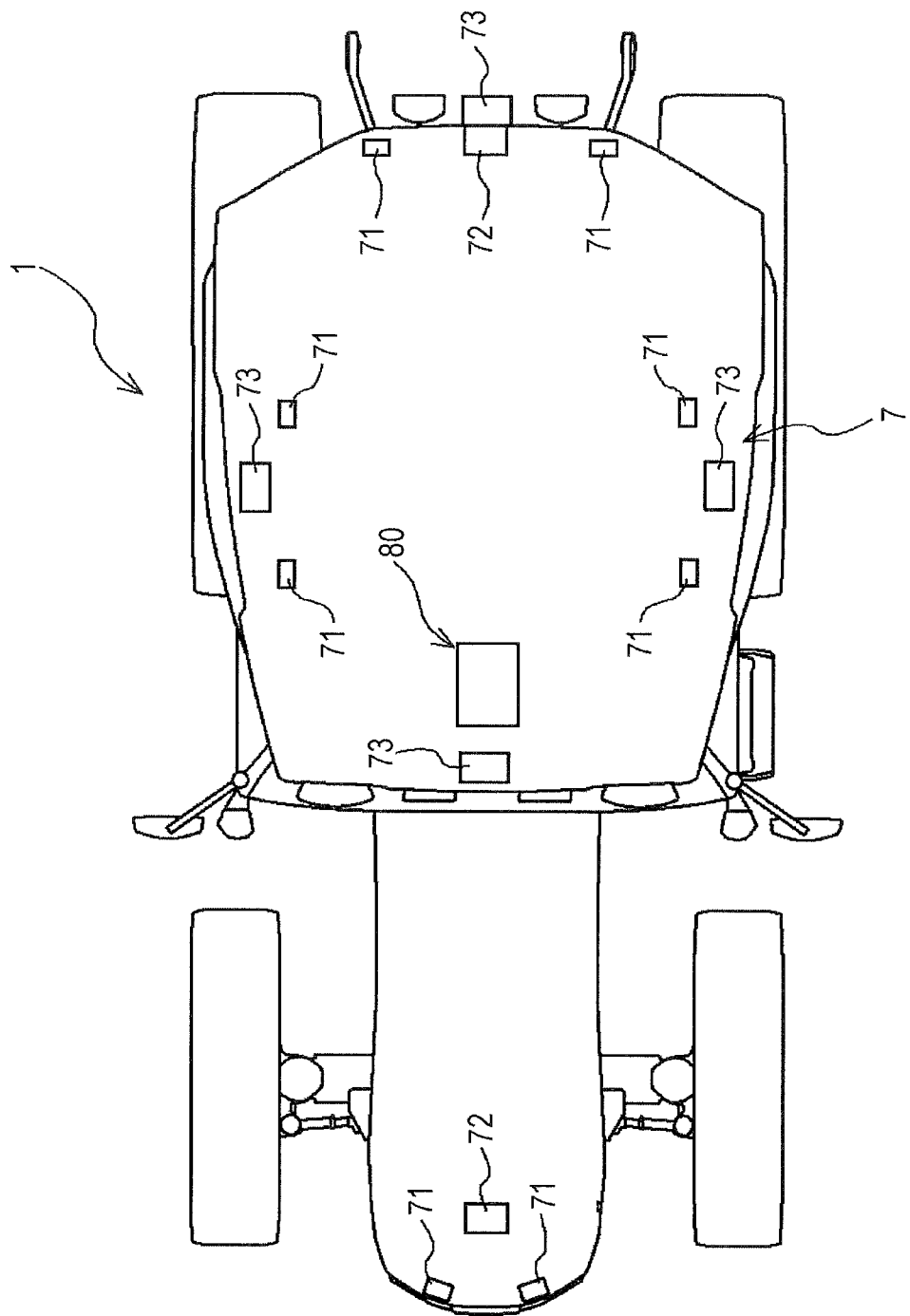
FIG. 2 is a schematic plan view of the tractor and illustrates obstacle sensors mounted on the tractor.

As schematically illustrated in FIG. 2, obstacle sensors 7 are mounted on the vehicle body 1 of the tractor to detect an obstacle that hinders the tractor from traveling. The obstacle sensors 7 include ultrasonic sonars 71, laser scanners (lidars) 72, and cameras 73. The number of ultrasonic sonars 71 is eight in total, two of which are respectively mounted on the front side, the rear side, the left side, and the right side of the vehicle body 1. The ultrasonic sonars 71 detect obstacles on almost the entire peripheral region around the vehicle body 1. The number of laser scanners 72 is two in total, one of which is mounted on the front side of the vehicle body 1 and the other one of which is mounted on the rear side of the vehicle body 1. The laser scanners 72 detect obstacles ahead of and behind the vehicle body 1. The number of cameras 73 is four in total, which are respectively mounted on the front side, the rear side, the left side, and the right side of the vehicle body 1. The cameras 73 capture images of the entire peripheral region around the vehicle body 1. In this embodiment, the cameras 73 are not used for only detecting obstacles around the vehicle body 1. Images captured by and output from the four cameras 73 are used as monitoring images without any processing or are used as overhead view images to be obtained by viewpoint conversion processing. The cameras 73 may have a facial recognition function. In this case, when the cameras 73 recognize a human face in captured images, then the cameras 73 add attribute information indicating the presence of the human face to data of the captured images to be output therefrom.

Figure 3:
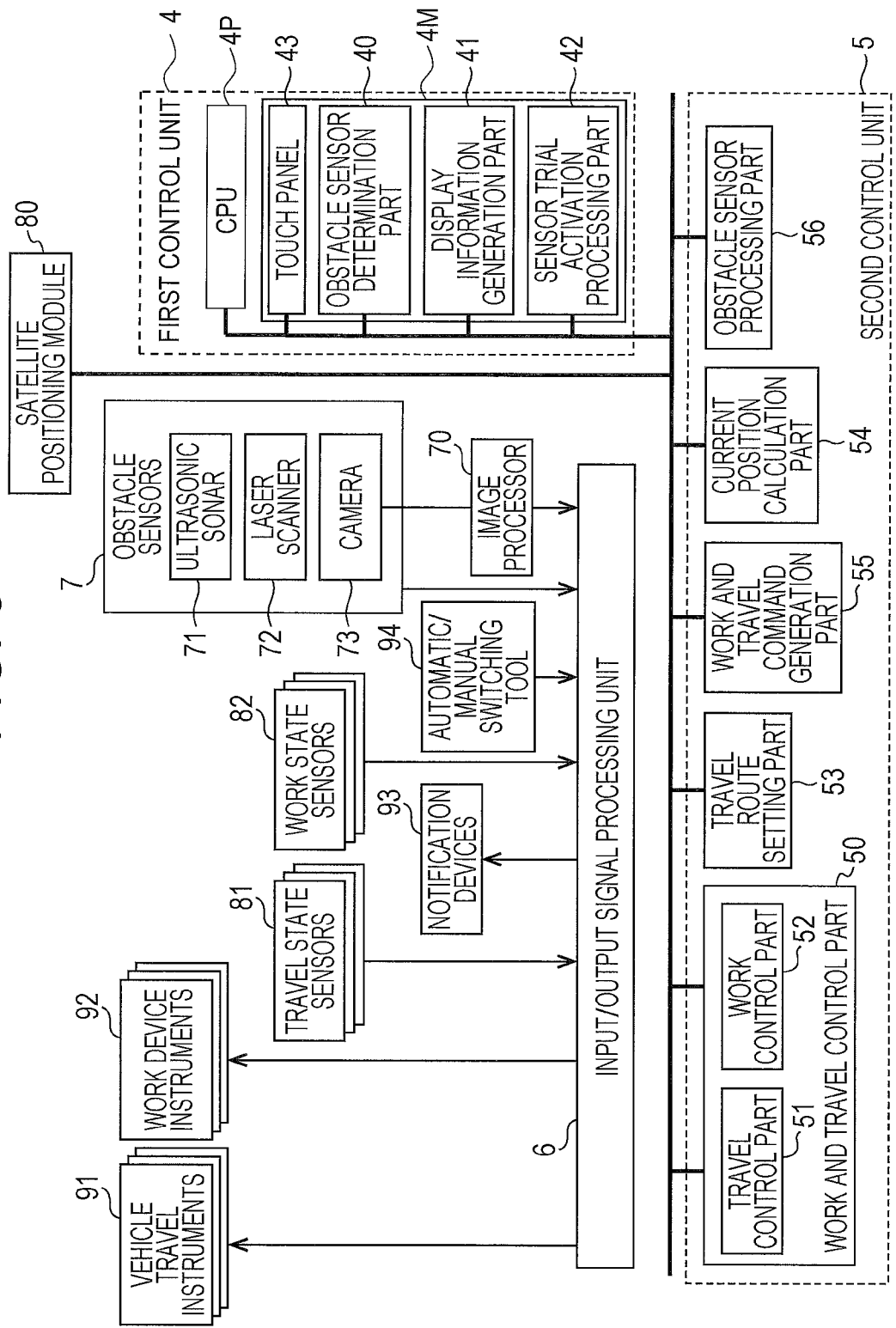
FIG. 3 shows a structure of a sensor management device and a control system in the tractor according to an embodiment of the present invention.

FIG. 3 illustrates a control system constructed in the tractor. The control system in this embodiment includes a first control unit constituted of the general-purpose terminal 4, a second control unit 5, and an input/output signal processing unit 6. The general-purpose terminal 4 executes sensor trial activation processing for checking whether the obstacle sensors 7 operate normally, using an actual target obstacle (the driver plays a role of the target obstacle in this embodiment). The second control unit 5 controls the work and travel of the tractor, based on results of detection by the obstacle sensors 7. The input/output signal processing unit 6 processes an input/output signal used for the work and travel of the tractor. The general-purpose terminal 4, the second control unit 5, and the input/output signal processing unit 6 are connected to one another via an on-vehicle local area network (LAN). The satellite positioning module 80 is also connected to the same on-vehicle LAN. The general-purpose terminal 4 which is removable from the tractor can be connected wirelessly to the on-vehicle LAN via the input/output signal processing unit 6 at the outside of the tractor.

The input/output signal processing unit 6 is connected to the obstacle sensors 7. In FIG. 3, each of the cameras 73 is coupled to the input/output signal processing unit 6 via an image processor 70 that generates a monitoring image from an image captured by each camera 73. The image processor 70 may be constructed in the input/output signal processing unit 6 or may be constructed in each camera 73. The image processor 70 may be configured to execute facial recognition processing.

The input/output signal processing unit 6 is also connected to vehicle travel instruments 91, work device instruments 92, notification devices 93, an automatic/manual switching tool 94, travel state sensors 81, and work state sensors 82. The vehicle travel instruments 91 include control instruments for the steering motor 14 as well as a transmission mechanism, an engine unit, and the like to be controlled for vehicle travel. The work device instruments 92 include control instruments for driving the work device 30 and the lifting mechanism 31. The notification devices 93 include devices for notifying the driver of a vehicle speed, an engine speed, a remaining amount of fuel, and the like, and devices for notifying the driver and an observer of cautions in the work and travel. The automatic/manual switching tool 94 is a switch for selecting one of an automatic steering mode in which the tractor travels by automatic steering and a manual steering mode in which the tractor travels by manual steering. For example, when the driver actuates the automatic/manual switching tool 94 at the time of travel in the automatic steering mode, the tractor is switched to travel by manual steering. On the other hand, when the driver actuates the automatic/manual switching tool 94 at the time of travel in the manual steering mode, the tractor is switched to travel by automatic steering. The travel state sensors 81 include sensors for detecting travel states such as a steering angle, an engine speed, and a transmission state. The work state sensors 82 include usage pattern sensors for detecting usage patterns such as an orientation of the work device 30, a height of the work device 30 from the ground, and a width of the work device 30 in its use.

The input/output signal processing unit 6 also includes a communication chipset for exchanging data with an external computer in conformity with a wireless communication standard or a wired communication standard. Therefore, the control system of the tractor can exchange data with a management computer in, for example, a management center at a remote site, and a tablet computer, a smartphone (a mobile phone), and the like of the driver or observer.

The general-purpose terminal 4 being the first control unit includes a touch panel 43 that serves as a graphic user interface, an obstacle sensor determination part 40 that executes sensor determination processing for determining whether the obstacle sensors 7 operate normally, a display information generation part 41, and a sensor trial activation processing part 42. In this embodiment, the obstacle sensors 7 include the ultrasonic sonars 71, the laser scanners 72, and the cameras 73 that are commonly referred to as "obstacle sensors" unless otherwise specified. The general-purpose terminal 4 includes a central processing unit (CPU) 4P (first circuitry, second circuitry, and third circuitry 4P) and a memory 4M which is preferably a non-volatile memory. Programs of the obstacle sensor determination part 40, the display information generation part 41, and the sensor trial activation processing part 42 are stored in the memory 4M and executed by the CPU 4P to perform functions of the obstacle sensor determination part 40, the display information generation part 41, and the sensor trial activation processing part 42, respectively.

The touch panel 43 serving as a graphic user interface includes a display panel portion. The display panel portion serves as a first notification part that provides a sensor trial activation start notification (an obstruction) causing a driver to place a target obstacle on a detection region of an obstacle sensor, in sensor trial activation processing. The display panel portion also serves as a second notification part provides a notification (a determination result) about an obstacle sensor of which the normal operation has been ascertained or an obstacle sensor of which the normal operation has not been ascertained yet, in the sensor trial activation processing. In this embodiment, the touch panel 43 of the general-purpose terminal 4 serves as a transportable display unit serving as both the first notification part and the second notification part according to the embodiment of the present invention. The display information generation part 41 generates display information to be displayed on the display panel portion of the touch panel 43. The sensor trial activation processing part 42 executes the sensor trial activation processing which will be described in detail later. In this embodiment, the sensor management device according to the embodiment of the present invention is substantially constituted of the general-purpose terminal 4. The general-purpose terminal 4 can switch the communication means from the on-vehicle LAN to wireless communications to exchange data with the second control unit 5 and the obstacle sensors 7 at the outside of the tractor.

The obstacle sensor determination part 40 determines a normal operation of each obstacle sensor, based on detection of the driver as the target obstacle, in response to the sensor trial activation start notification. When the obstacle sensor determination part 40 ascertains that an obstacle sensor operates normally, then the obstacle sensor determination part 40 sends an identification code of the obstacle sensor and the fact that the normal operation has been ascertained, to the sensor trial activation processing part 42 and the display information generation part 41.

The second control unit 5 includes a work and travel control part 50, a travel route setting part 53, a current position calculation part 54, a work and travel command generation part 55, and an obstacle sensor processing part 56. The travel route setting part 53 develops a travel route serving as an automatic travel objective route onto a memory in a readable manner. The travel route may be prepared by the tractor. Alternatively, the travel route prepared by a different computer may be downloaded onto the second control unit 5. The current position calculation part 54 calculates a coordinate position of the vehicle body 1 on a map, based on positioning data from the satellite positioning module 80 that adopts, for example, a GPS. In automatic travel, the work and travel command generation part 55 obtains an amount of displacement of the current position calculated by the current position calculation part 54 from the travel route set by the travel route setting part 53, and generates a travel command (including a steering command and a vehicle speed command) for reducing the amount of displacement.

The work and travel control part 50 includes a travel control part 51 and a work control part 52. The travel control part 51 has an automatic travel control function (an automatic travel mode) and a manual travel control function (a manual travel mode). In the automatic travel mode, the travel control part 51 transmits a control signal to the vehicle travel instruments 91, based on a travel command from the work and travel command generation part 55. Moreover, the work control part 52 transmits a control signal to the work device instruments 92, based on a work command from the work and travel command generation part 55. In the manual travel mode, the driver manually operates the tractor, using the steering wheel 22. Likewise, the work control part 52 has an automatic work control function of automatically operating the work device instruments 92 and a manual work control function of manually controlling the work device instruments 92 using the various operation tools.

The obstacle sensor processing part 56 performs a sensor check as to whether an obstacle sensor operates normally, about once a day. When the obstacle sensor processing part 56 receives from the sensor trial activation processing part 42 a notification that the normal operations of all the obstacle sensors have been ascertained, then the obstacle sensor processing part 56 gives a permission command for permitting automatic travel to the work and travel control part 50. If the normal operations of all the obstacle sensors are not ascertained, that is, if there is an obstacle sensor of which the normal operation has not been ascertained yet, the obstacle sensor processing part 56 gives a prohibition command for prohibiting automatic travel to the work and travel control part 50. In automatic travel and manual work, when the obstacle sensors detect an obstacle in the traveling direction of the vehicle body 1, the obstacle sensor processing part 56 gives to the work and travel control part 50 a stop command for stopping the vehicle body 1 or a deceleration command for reducing the vehicle speed. When the obstacle sensors detect an obstacle at a peripheral region around the vehicle body 1 rather than the obstacle in the traveling direction of the vehicle body 1, the obstacle sensor processing part 56 may also give the deceleration command for reducing the vehicle speed to the work and travel control part 50. When the obstacle sensor processing part 56 gives any command to the work and travel control part 50, the notification devices 93 provide a notification about the details of the command at the same time. In manual travel, when the obstacle sensors 7 detect an obstacle, the detection is notified, but the tractor is permitted to travel in principle. However, when an obstacle in the traveling direction is detected, the tractor stops urgently.

Figure 4:
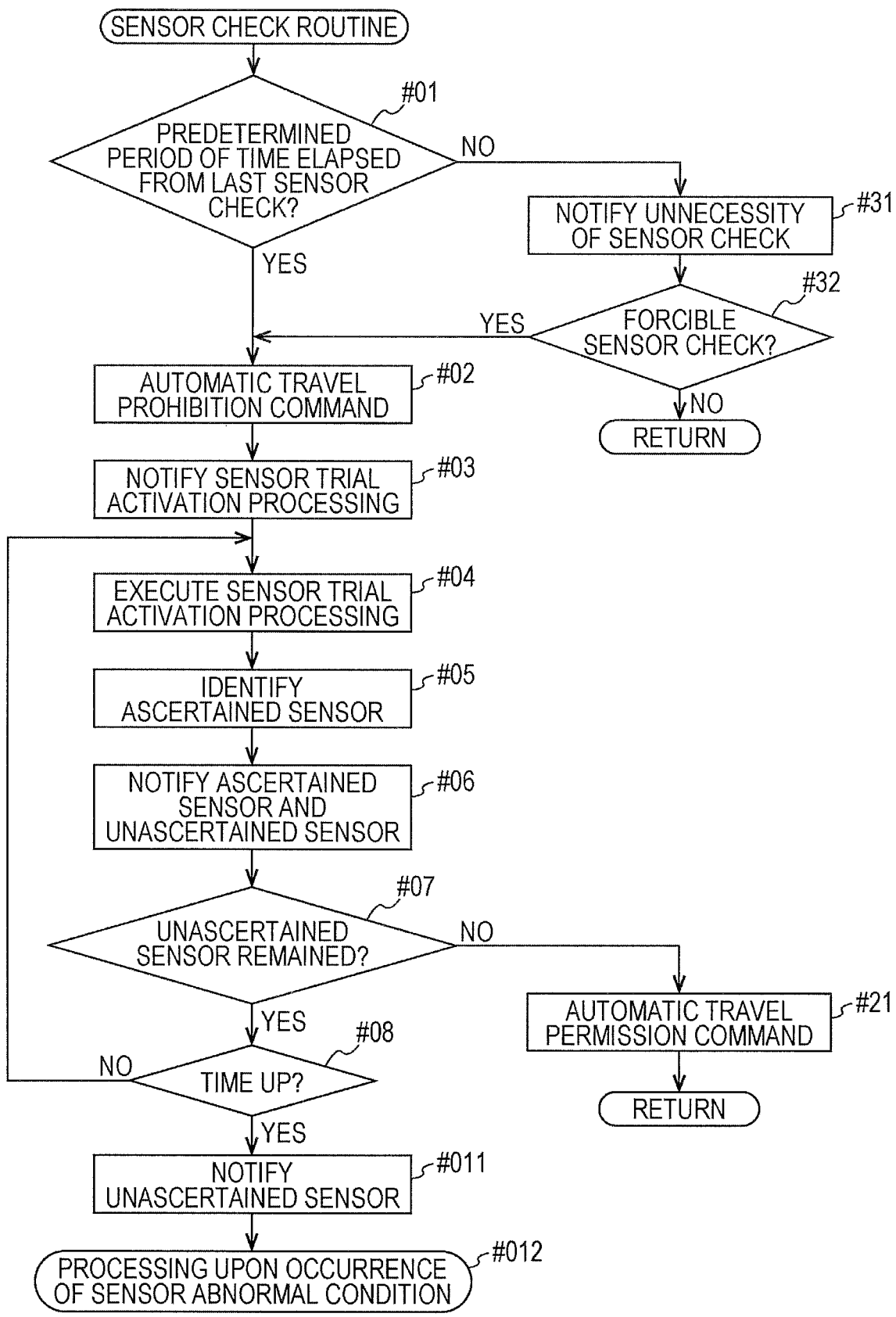
FIG. 4 is a flowchart of an exemplary operational check to be performed on obstacle sensors by a sensor management device.

With reference to FIG. 4, next, a description will be given of a sensor check routine for checking, using an actual target obstacle, whether the obstacle sensors of the tractor operate normally, about once a day. In this embodiment, the target obstacle is the driver, but may be a person other than the driver, such as a work assistant or a work manager.

Figure 5:
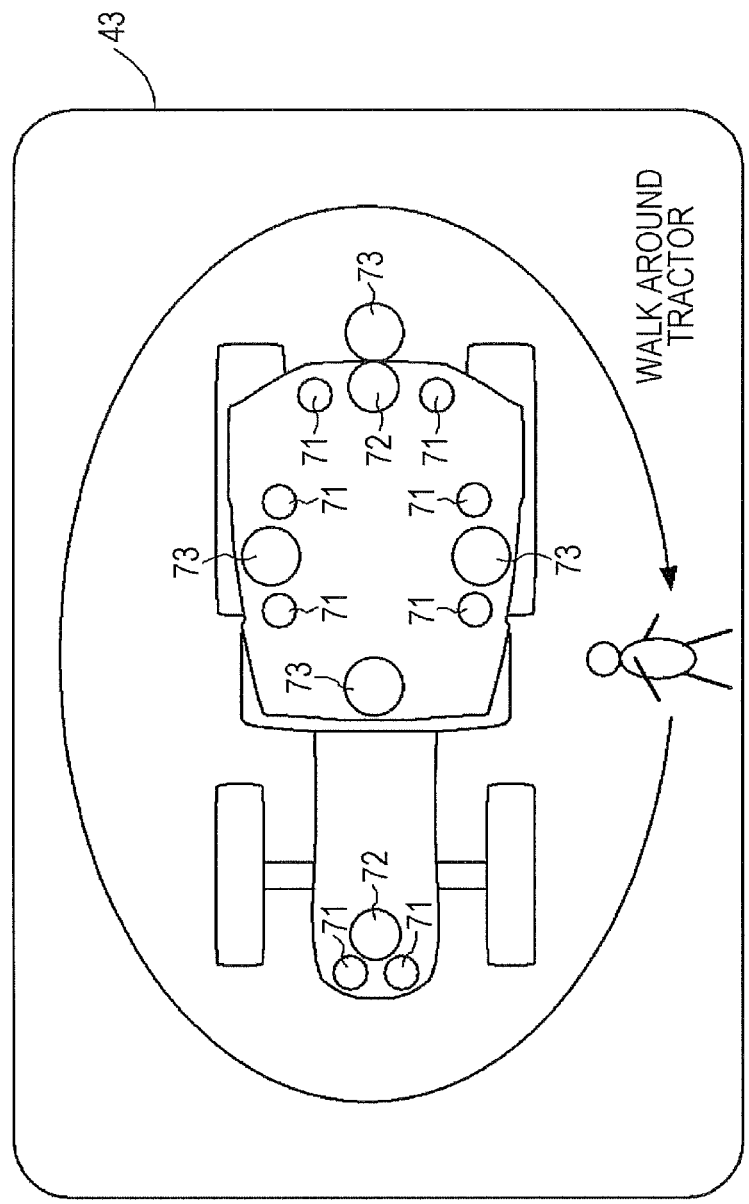
FIG. 5 illustrates a touch panel screen for notifying a user of a start of sensor trial activation processing.

The sensor check is performed about once a day. Therefore, when the routine is invoked, a check is performed as to whether a predetermined time period has been elapsed from the last sensor check (#01). Instead of the predetermined time period, date management may be conducted to perform a check as to whether the sensor check has been conducted once today. If the predetermined time period has been elapsed (Yes in #01), a prohibition command is issued for prohibiting automatic travel (#02). Next, a sensor trial activation start notification is provided (#03). As illustrated in FIG. 5, the sensor trial activation start notification is a message "WALK AROUND TRACTOR" on the touch panel 43 of the general-purpose terminal 4 such that all the obstacle sensors can detect the driver as the target obstacle.

When the sensor trial activation start notification is provided, the driver removes the general-purpose terminal 4 from the tractor, descends out of the tractor, and walks around the tractor. At the same time, the sensor trial activation processing part 42 executes the sensor trial activation processing (#04). In the sensor trial activation processing, a determination is made as to whether the driver is detected, based on a signal from each obstacle sensor. An obstacle sensor that detects the driver is regarded as an obstacle sensor operating normally. An identification code of the obstacle sensor is recorded for specifying the obstacle sensor of which the normal operation has been ascertained (#05). This identification code is given to the display information generation part 41.

Figure 6:
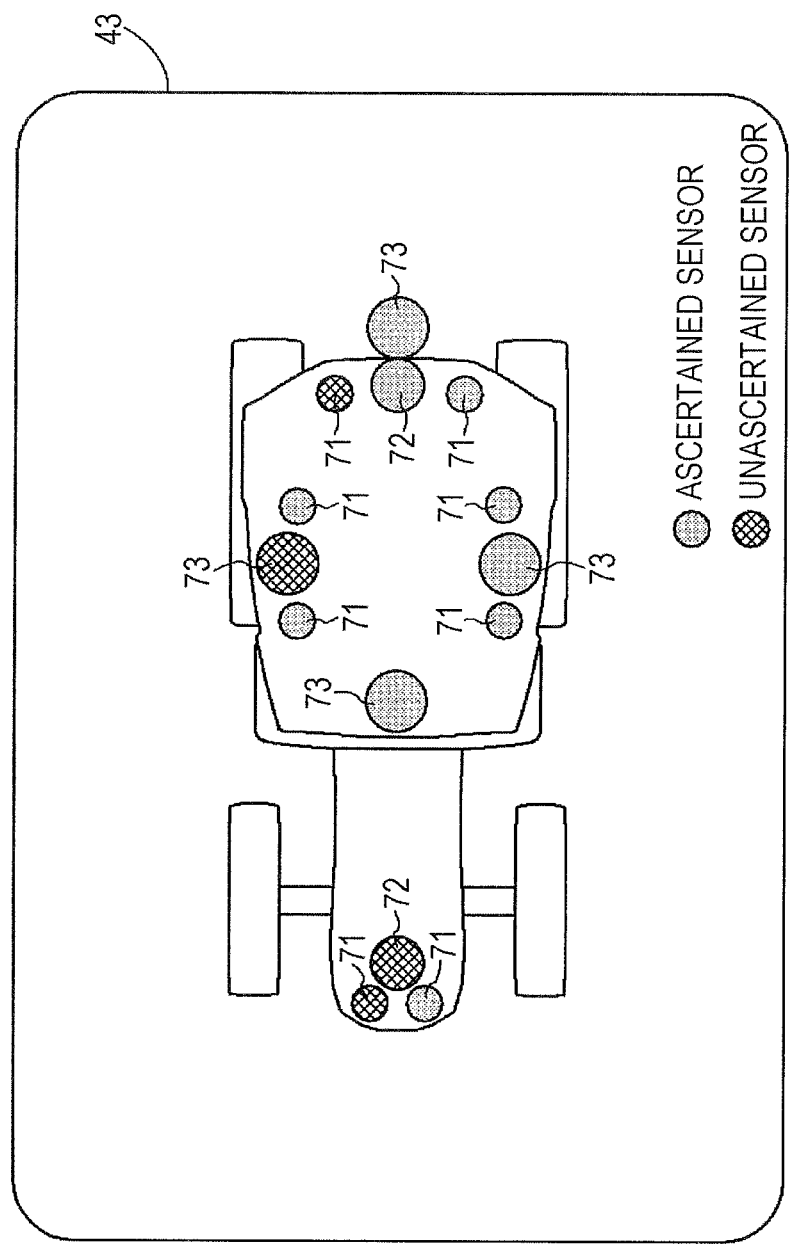
FIG. 6 illustrates a touch panel screen indicating a status of each obstacle sensor in the sensor trial activation processing.

The display information generation part 41 generates, from the identification code of the obstacle sensor of which the normal operation has been ascertained, display information for displaying a screen illustrated in FIG. 6, in order to provide a notification such that an obstacle sensor of which the normal operation has been ascertained and an obstacle sensor of which the normal operation has not been ascertained yet are distinguishable, and then causes the touch panel 43 to display the screen (#06). This screen shows a schematic illustration of the tractor in plan view, and all the obstacle sensors are shown with symbols (simple geometric graphics; circles in this embodiment) in this illustration. The symbols of obstacle sensors of which the normal operations have been ascertained blink or light up green, whereas the symbols of obstacle sensors of which the normal operations have not been ascertained yet blink or light up red. The driver sees the screen and, if there is an obstacle sensor of which the normal operation has not been ascertained yet, enters the detection region of the obstacle sensor. The driver can thus carefully check whether the obstacle sensor operates normally.

During the sensor trial activation processing, the sensor trial activation processing part 42 checks whether there still remain obstacle sensors of which the normal operations have not been ascertained yet (#07). If there still remains an obstacle sensor of which the normal operation has not been ascertained yet (Yes in #07), the sensor trial activation processing part 42 checks whether a lapse of time for this sensor trial activation processing exceeds a time limit (#08). If the lapse of time does not exceed the time limit (No in #08), the routine returns to step #04 for continuance of the sensor trial activation processing.

If the lapse of time for the sensor trial activation processing exceeds the time limit (Yes in #08), it is considered that an obstacle sensor of which the normal operation has not been ascertained may suffer from any failure or a surface thereof may be contaminated by foreign matters such as mud, and therefore this factor is notified (#11). The routine then proceeds to processing upon occurrence of a sensor abnormal condition (#12). In the processing upon occurrence of a sensor abnormal condition, a procedure for resolving troubles is shown. If the troubles are not resolved, sensor abnormal condition information including the specifications of an obstacle sensor with the troubles can be sent to a tractor service center nearest the driver.

In step #07, if there remain no obstacle sensors of which the normal operations have not been ascertained yet, that is, if the normal operations of all the obstacle sensors have been ascertained (No in #07), the prohibition command, which has been set in step #02, for prohibiting the automatic travel is canceled, and a permission command is issued for permitting the automatic travel (#21). The routine thus ends.

In the beginning of the routine, if the predetermined time period is not elapsed in the check (#01) as to whether the predetermined time period has been elapsed from the last sensor check (No in #01), a notification that the sensor check is unnecessary is provided (#31). Nevertheless, if the driver desires the sensor check, the driver presses a forcible sensor check button displayed on the touch panel 43 of the general-purpose terminal 4 (Yes in #32), so that the sensor check is forcibly performed. Therefore, the routine proceeds to step #02. When the driver does not press the forcible sensor check button, but presses a cancel button displayed similar to the forcible sensor check button (No in #32), this sensor check is canceled, and the routine ends.

Other Embodiments (1) In the foregoing embodiment, the obstacle sensors include the ultrasonic sonars 71, the laser scanners 72, and the cameras 73. The embodiment of the present invention may alternatively adopt obstacle sensors different from those described above or may alternatively adopt one kind or two kinds from among the ultrasonic sonars 71, the laser scanners 72, and the cameras 73.

(2) In the foregoing embodiment, the driver walks around the tractor while carrying the general-purpose terminal 4 in executing the sensor trial activation processing. Alternatively, a stationary terminal in the tractor may have the same function as that of the general-purpose terminal 4. Still alternatively, the general-purpose terminal 4 may be fixed to the tractor. Still alternatively, a mobile phone of the driver may be used instead of the general-purpose terminal 4. In this case, the function of the second notification part displaying at least the screen in FIG. 6 is implemented by a display function using a display of the mobile phone. In cases where a work assistant or a work manager rather than the driver walks around the tractor, a mobile phone or the like of the work assistant or work manager may be used instead of the general-purpose terminal 4.

(3) In the foregoing embodiment, each of the first notification part and the second notification part is constituted of a display to notify information in the form of screen display. Alternatively, one of or both the first notification part and the second notification part may be constituted of a visual notifying instrument or an auditory notifying instrument. For example, the first notification part may be constituted of the touch panel 43, whereas the second notification part may be constituted of a lamp instrument or a voice notifying instrument.

(4) In the foregoing embodiment, the tractor equipped with the cultivating device is described as the work vehicle. The embodiment of the present invention is alternatively applicable to a tractor equipped with a work device 30 different from the cultivating device and is also applicable to a farm machine such as a combined harvester and thresher or a rice-planting machine, and a construction machine.

(5) In the foregoing embodiment, the general-purpose terminal (the first control unit) 4, the second control unit 5, and the input/output signal processing unit 6 are connected to one another via the on-vehicle LAN in the tractor. The general-purpose terminal 4 is not mounted on the tractor, but may be a tablet computer, a notebook-size computer, a smartphone, or the like which is originally carried by a driver and is configured to exchange data with the control system of the tractor in a wireless manner.

(6) The segmentation of the respective units in the diagram of FIG. 3 is merely an example for convenience of the description. The various units may be freely integrated with one another or each unit may be freely divided into multiple units.

INDUSTRIAL APPLICABILITY

The embodiment of the present invention is applicable to a work vehicle on which an obstacle sensor is mounted, the work vehicle being capable of automatic travel.

The embodiment of the present invention provides a sensor management device for determining whether one or more obstacle sensors operate normally, the obstacle sensors being mounted on a work vehicle capable of automatic travel. The sensor management device includes: a first notification part that provides a sensor trial activation start notification causing a user to place a target obstacle on detection regions of the obstacle sensors; an obstacle sensor determination part that determines a normal operation of each obstacle sensor, based on detection of the target obstacle, in response to the sensor trial activation start notification; and a second notification part that provides a notification about a result of a determination of the normal operation by the obstacle sensor determination part.

With this configuration, the user (e.g., a driver, an observer) places a target obstacle detectable by the obstacle sensors, on the detection regions of the obstacle sensors, thereby practically ascertaining whether the obstacle sensors operate normally. By the practical trial activation for the obstacle sensors, the user can check whether the obstacle sensors operate normally and, additionally, can check whether the obstacle sensors malfunction due to an inappropriate external environment. Moreover, since the result of the determination of the normal operation by the obstacle sensor determination part is notified, the check is reliably performed on all the obstacle sensors. It is thus possible to ascertain that the obstacle sensors operate normally and, additionally, to ascertain that the external environment is maintained appropriately.

According to an embodiment of the present invention, when the normal operations of all the obstacle sensors are not ascertained, the work vehicle is prohibited from traveling automatically. With this configuration, the automatic travel is permitted on the condition that the normal operations of all the obstacle sensors have been ascertained by the practical trial activation for the obstacle sensors. It is therefore possible to avoid a disadvantage that the work vehicle travels automatically although some of the obstacle sensors do not operate normally.

In order to place a target obstacle on the detection regions of the obstacle sensors in the simplest way, the user plays a role of the target obstacle. According to an embodiment of the present invention, therefore, the target obstacle is a person, and the first notification part provides a notification causing the person to walk around the work vehicle. With this configuration, the practical operational check can be performed on the obstacle sensors when the person simply walks around the work vehicle. Sensor trial activation processing can thus be executed easily and reliably. The person who walks around the work vehicle may be a user who directly handles the work vehicle or may be a person other than the user, such as a work assistant who assists the user.

Multiple obstacle sensors are required for monitoring all around the work vehicle. In order that the user performs an operational check on the multiple obstacle sensors completely, accordingly, it is important to notify the user of obstacle sensors such that the obstacle sensors of which the normal operations have been ascertained and the obstacle sensors of which the normal operations have not been ascertained yet are distinguishable and to cause the user to place a target obstacle on the detection regions of the obstacle sensors of which the normal operations have not been ascertained yet. According to an embodiment of the present invention, therefore, the second notification part provides a notification such that the obstacle sensor of which the normal operation has been ascertained and the obstacle sensor of which the normal operation has not been ascertained are distinguishable.

It is advantageous that when the user places any dummy obstacle on the detection regions of the obstacle sensors or the user enters the detection regions of the obstacle sensors in order to perform the operational check on the obstacle sensors, then the user can grasp at hand a result of the determination of the normal operation by the obstacle sensor determination part. Moreover, a visual notification through a screen makes the user easily understand the notification and is therefore convenient for the user. From this point of view, according to an embodiment of the present invention, the first notification part and the second notification part are constituted of a common transportable display unit. With this configuration, it is advantageous in terms of cost since the first notification part and the second notification part are integrated into a single unit.

The operational check for the obstacle sensors, which is troublesome for the user and is performed every start of work, puts a burden upon the user and causes a delay of work. For this reason, it is important to set a predetermined time period in advance so as to avoid the operational check from being performed frequently. According to an embodiment of the present invention, therefore, the normal operation of each obstacle sensor is not determined for a predetermined time period after the normal operations of all the obstacle sensors have been ascertained.

Obviously, numerous modifications and variations of the present invention are possible in light of the above teachings. It is therefore to be understood that within the scope of the appended claims, the invention may be practiced otherwise than as specifically described herein.

What is claimed is:

1. A sensor management device comprising:
   a first control unit; and
   a second control unit configured to control an automatic travelling of a work vehicle,
   wherein the first control unit is configured to execute programs to:
      determine whether a first elapsed time has been longer than a time threshold;
      cause the second control unit to issue a prohibition command to prohibit the automatic travelling of the work vehicle when the first elapsed time is determined to be longer than the time threshold;
      output an instruction to position a target obstacle in a detectable region of a plurality of obstacle sensors after the automatic travelling of the work vehicle is prohibited;
      determine, based on an output of the plurality of obstacle sensors provided on the work vehicle, whether the plurality of obstacle sensors detects the target obstacle;
      output a detection result for each obstacle sensor of the plurality of obstacle sensors that detects the target obstacle in the detectable region;
      determine whether a second elapsed time has exceeded a time limit from a time when the automatic travelling was prohibited; and
      cause the second control unit to issue a permission command to allow the automatic travelling of the work vehicle when the second elapsed time has not exceeded the time limit during a first sensor check routine and when the detection result has been output for all of the plurality of obstacle sensors during a subsequent sensor check routine; wherein the instruction and the detection result are outputted via a common transportable display unit.

2. The sensor management device according to claim 1, wherein the target obstacle comprises a person, and wherein the first control unit is configured to execute programs to output the instruction instructing the person to walk around the work vehicle.

3. The sensor management device according to claim 1, wherein the detection result is outputted such that a first sensor of the plurality of obstacle sensors which detects the target obstacle in the detectable region of the first sensor is distinguishable from a second sensor of the plurality of obstacle sensors which fails to detect the target obstacle in the detectable region of the second sensor.

4. The sensor management device according to claim 1, wherein the first control unit is configured to execute programs to inform an additional instruction to check whether a surface of a sensor of the plurality of obstacle sensors is contaminated by foreign matters when the sensor fails to detect the target obstacle in the detectable region.

5. The sensor management device according to claim 1,
wherein the first control unit is configured to execute programs to output a notification that a sensor check is unnecessary when the first elapsed time has not been longer than the time threshold.

6. The sensor management device according to claim 5,
wherein the first control unit is configured to execute programs to output the instruction when testing of the plurality of obstacle sensors is manually requested even though the first elapsed time has not been longer than the time threshold,
wherein the first control unit is configured to execute programs to determine whether the plurality of obstacle sensors detects the target obstacle when the testing is manually requested, and
wherein the first control unit is configured to execute programs to cause the second control unit to prohibit the automatic travelling of the work vehicle until the detection result has been output for all of the plurality of obstacle sensors after the testing is manually requested.

7. A sensor management method comprising:
determining whether a first elapsed time has been longer than a time threshold;
prohibiting an automatic travelling of a work vehicle when the first elapsed time is determined to be longer than the time threshold;
outputting, after the automatic travelling of the work vehicle is prohibited, an instruction to position a target obstacle in a detectable region of a plurality of obstacle sensors;
determining whether the plurality of obstacle sensors detects the target obstacle after the instruction is outputted;
outputting a detection result for each obstacle sensor of the plurality of obstacle sensors that detects the target obstacle in the detectable region;
determining whether a second elapsed time has exceeded a time limit from a time when the automatic travelling was prohibited; and
allowing the automatic travelling of the work vehicle when the second elapsed time has not exceeded the time limit during a first sensor check routine and when the detection result has been output for all of the plurality of obstacle sensors during a subsequent sensor check routine; wherein the instruction and the detection result are outputted via a common transportable display unit.

8. The sensor management method according to claim 7, further comprising:
outputting an additional instruction to check whether a surface of a sensor of the plurality of obstacle sensors is contaminated by foreign matters when it is determined that the sensor fails to detect the target obstacle in the detectable region after the instruction.

9. The sensor management method according to claim 7,
wherein a notification that a sensor check is unnecessary is outputted when the first elapsed time has not been longer than the time threshold.

10. The sensor management method according to claim 9, further comprising:
outputting the instruction when testing of the plurality of obstacle sensors is manually requested even though the first elapsed time has not been longer than the time threshold;
determining whether the plurality of obstacle sensors detects the target obstacle after the instruction is outputted when the testing is manually requested; and
prohibiting the automatic travelling of the work vehicle until the detection result has been output for all of the plurality of obstacle sensors after the testing is manually requested.

* * * * *